(12) United States Patent
McCoy, Jr.

(10) Patent No.: US 7,231,837 B2
(45) Date of Patent: Jun. 19, 2007

(54) ANGULAR MOVEMENT DETECTOR AND NETWORKS OF ANGULAR MOVEMENT DETECTORS FOR CONTROLLING MOVEMENT OF AN ARTICULATED ARM AND A METHOD FOR THEIR USE

(75) Inventor: Richard W. McCoy, Jr., Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 66 days.

(21) Appl. No.: 11/124,505

(22) Filed: May 6, 2005

(65) Prior Publication Data

US 2006/0248964 A1 Nov. 9, 2006

(51) Int. Cl.
*G01L 1/22* (2006.01)
(52) U.S. Cl. ............ 73/862.041; 73/862; 73/862.042; 324/207.2; 324/207.22; 324/207.25; 700/245
(58) Field of Classification Search ............... None
See application file for complete search history.

(56) References Cited

U.S. PATENT DOCUMENTS

| | | | |
|---|---|---|---|
| 4,964,062 A | 10/1990 | Ubhayakar et al. | |
| 5,103,403 A | 4/1992 | Ch'Hayder et al. | |
| 5,279,309 A | 1/1994 | Taylor et al. | |
| 5,820,623 A | 10/1998 | Ng | |
| 5,838,882 A | 11/1998 | Gan et al. | |
| 6,220,104 B1 * | 4/2001 | Yoshino et al. | ........... 73/862.08 |
| 6,234,672 B1 | 5/2001 | Tomasetti et al. | |
| 6,326,781 B1 | 12/2001 | Kunde et al. | |
| 6,429,016 B1 | 8/2002 | McNeil | |
| 6,448,763 B1 | 9/2002 | Spellman | |
| 6,492,807 B2 | 12/2002 | Spellman | |
| 6,493,606 B2 | 12/2002 | Saijo et al. | |
| 6,495,820 B1 | 12/2002 | Cooper | |
| 6,660,997 B2 | 12/2003 | Laberge et al. | |
| 6,693,423 B2 | 2/2004 | Weser | |
| 6,707,293 B2 | 3/2004 | Wan et al. | |
| 6,719,069 B2 | 4/2004 | Alft et al. | |
| 6,928,947 B1 * | 8/2005 | Clapham | ..................... 114/312 |
| 7,129,700 B2 * | 10/2006 | Okubo et al. | ........... 324/207.25 |
| 2002/0082612 A1 | 6/2002 | Moll et al. | |
| 2004/0078182 A1 | 4/2004 | Nixon et al. | |

OTHER PUBLICATIONS

Lam, Kai Sing, et al. "Development of Joint Sensor and Signal Processing"; Thesis Description; one page.

* cited by examiner

*Primary Examiner*—Edward Lefkowitz
*Assistant Examiner*—Freddie Kirkland, III
(74) *Attorney, Agent, or Firm*—Duane Morris LLP

(57) ABSTRACT

Angular movement detectors may be disposed within or proximate to joints in one or more members of articulated arms and linked via one or more communications networks to a controller to provide angular movement data to the controller for use in controlling movement of the articulated arm. The communications networks may be redundant.

20 Claims, 5 Drawing Sheets

ANGULAR MOVEMENT DETECTOR AND NETWORKS OF ANGULAR MOVEMENT DETECTORS FOR CONTROLLING MOVEMENT OF AN ARTICULATED ARM AND A METHOD FOR THEIR USE

FIELD OF INVENTION

The present invention relates generally to the field of controllers. More specifically, the present invention discloses an angular movement detector and a system of deploying such angular movement detectors useful in controlling movement of an articulated arm.

BACKGROUND OF THE INVENTION

In existing manipulator or robotic arm designs, the angular displacement of one or more joints is monitored with a resolver, potentiometer, or other rotation sensor. These require some sort of mechanical connection, typically a shaft, between the moveable portion of the joint and the sensor. Sensors are typically held stationary by the non-moveable portion of the joint. In a subsea environment, mechanical connection, e.g. a shaft, must be equipped with a mechanical connection seal to prevent seawater intrusion into the sensor. This mechanical connection seal is prone to failure, thus resulting in the subsequent failure of the sensor.

Further, existing solutions require discrete wiring for each sensor installed. Arms with large numbers of joint sensors require considerable wiring that can be difficult to install and maintain.

Further, existing sensor types often require that some sort of host controller read analog values that are produced by the sensor, e.g. a resolver or potentiometer. This requires that the controller provide processing power to read, filter, and scale the readings of each of the sensors which have had to transmit analog signals over long, noise-prone conductors.

SUMMARY OF THE INVENTION

Embodiments of the invention comprise an angular movement detector. In certain claimed embodiments, the angular movement detector comprises a trigger mounted proximate a joint of two articulated members and an angle orientation sensor disposed proximate the trigger and proximate the joint of the two articulated members. In this embodiment, the angle orientation sensor is adapted to detect an angular orientation of the articulated members with respect to each other in at least one plane and is, the angle orientation sensor further mechanically decoupled from rotation of the joint with respect to the trigger. Certain embodiments comprise a system for determining angular position of two members joined and movable with respect to each other in two planes. Other embodiments comprise a position sensing system. Other embodiments comprise a control network adapted to control movement of an articulated arm. Additionally, a method is disclosed and claimed for determining angular movement of a first member of an articulated arm with respect to a second member of the articulated arm, the members rotatably joined at a joint to effect motion in two planes.

BRIEF DESCRIPTION OF EMBODIMENTS OF THE INVENTIONS

Figure 1:
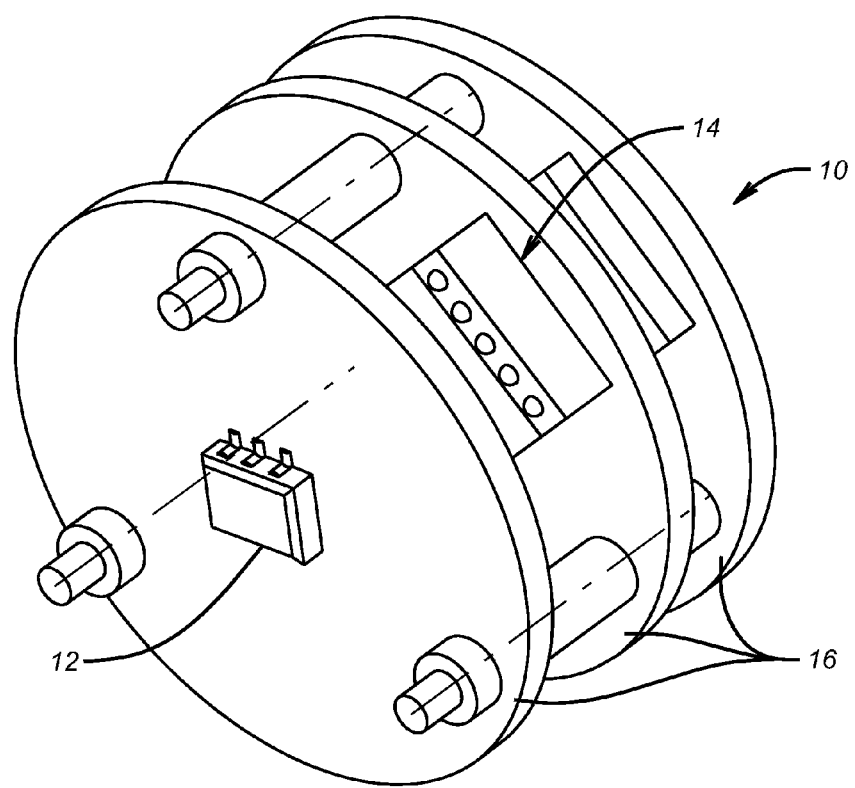
FIG. 1 is a view in partial perspective of an embodiment illustrating an angular movement detector.

In exemplary embodiments described herein below, the inventions comprise one or more angular movement detectors 10 (FIG. 1) capable of resolution of angular movement of two members rotatably joined and moveable within at least two planes. Position sensing system 1 (FIG. 4) comprises two or more such angular movement detectors 10 and communications network 100 with which sensors 12 are operatively in communication. Redundant system 2 (FIG. 5) provides additional features to system 1.

Figure 2:
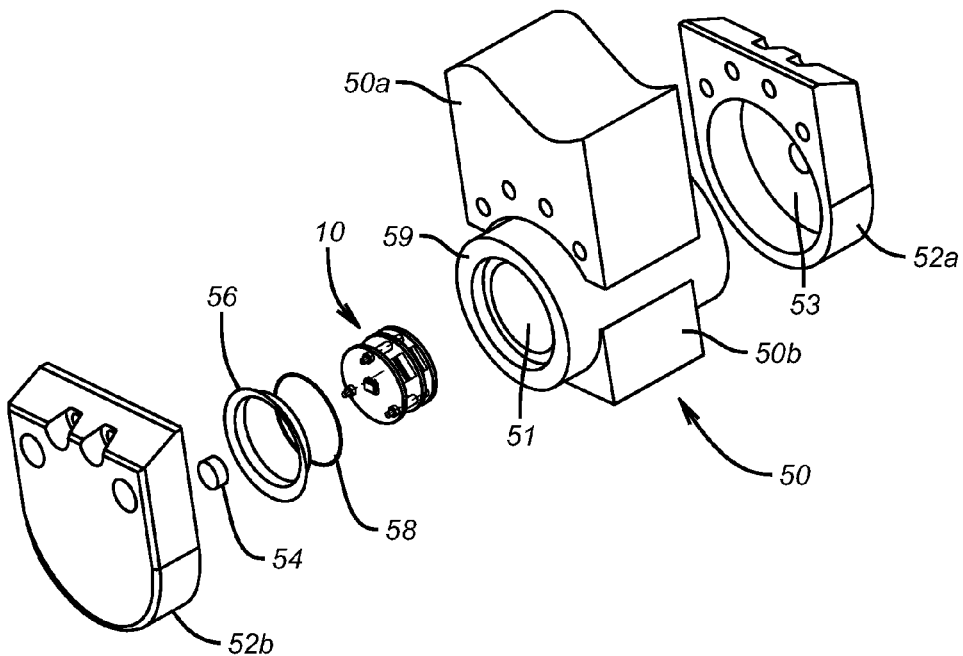
FIG. 2 is an exploded view in partial perspective of an embodiment illustrating an angular movement detector and a joint of an articulated arm.
Figure 3:
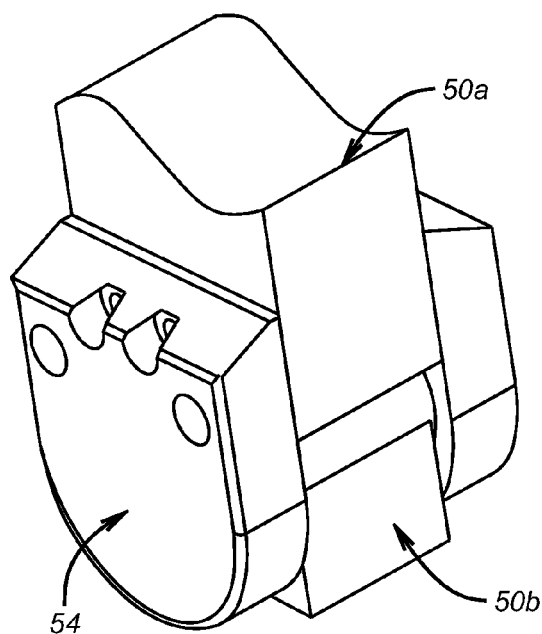
FIG. 3 is a view in partial perspective of an embodiment illustrating the joint of an articulated arm.

Referring now to FIGS. 1-3, in typical embodiments, each angular movement detector 10 is adapted to be housed within) but isolated from manipulator joint 50 (FIG. 2). Angular movement detector 10 is mechanically decoupled from the rotation of joint 50 with respect to trigger 54, e.g. field generator 54 (FIG. 2), to which sensor 12, housed either within or proximate angular movement detector 10, is sensitive.

In an embodiment, angular movement detector 10 is useful for an articulated arm control network, e.g. network 200 (FIG. 4) or network 300 (FIG. 5), and comprises sensor 12 adapted to be disposed within or proximate joint 50 (FIG. 2) of articulated member 210 (FIG. 4). and trigger 54 (FIG. 2) disposed proximate to sensor 12. Sensor 12 can sense changes in or caused by trigger 54. Electronics 14 may be present and in communication with sensor 12, e.g. to further condition or otherwise adapt signals from sensor 12 and to interface with articulated arm control network 200, 300. For example, electronics 14 may comprise a suitable analog-to-digital converter.

Sensor 12 and/or trigger 54 as well as electronics 14 may be mounted on one or more carrier plates 16.

In a preferred embodiment, sensor 12 is sensitive or other otherwise adapted to detect an orientation of an electromagnetic field, e.g. by sensitive to orientation of such a magnetic field, and may comprise one or more anistropic magneto-restrictive sensors, Hall-effect sensors such as a two-axis Hall-effect sensor, or the like, or a combination thereof.

Trigger 54 may be electromagnetic field generator 54 (FIG. 2) which triggers sensor 12. Trigger 54 may comprise a magnet or other source of a magnetic field where the generated magnetic field is strong enough to be detected by sensor 12.

Positioning of triggers 54 and sensors 12 may be interchanged, i.e. triggers 54 may be adapted to be housed in angular movement detector 10 and sensors 12 disposed proximate sensor triggers 54 elsewhere within or proximate to manipulator joint 50 or vice-a-versa.

Sensor 12 may be further adapted to communicate with a communications network, e.g. communications network 100 or 300a,b.

In an embodiment, one or more titanium windows 56 (FIG. 2) may be present in which sensor electronics 14 are disposed.

Referring now to FIG. 2, joint 50 may further comprise annulus 51 adapted to receive a fluid such as a hydraulic fluid. Angular movement detector 10 may be disposed within annulus 51 and/or in fluid disposed in annulus 51.

As illustrated in FIG. 2 and FIG. 3, joint 50 comprises rotating arm member 50a arranged in a rotating configuration about stationary arm member 50b. It is understood that, as used herein, stationary means relative or with respect to rotating arm member 50a.

In a typical embodiment, endcaps 52a, 52b are adapted to movingly seal against joint housing 59. Accordingly, one or more seals 58, e.g. O-rings, may be present to help seal joint 50 during rotation, as will be familiar to those of ordinary skill in the art. Endcaps 52a, 52b may be selectively removable, e.g. hinged, to allow access to angular movement detector 10.

Figure 4:
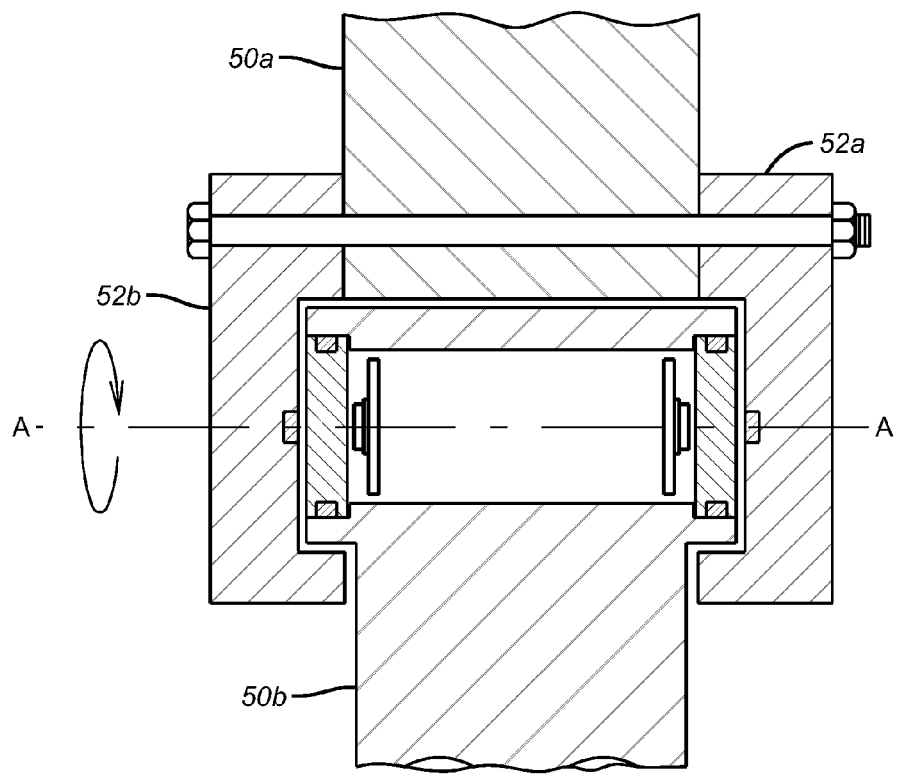
FIG. 4 is a view in partial cutaway perspective of an embodiment illustrating the joint of an articulated arm.

Referring now to FIG. 4, in a further contemplated embodiment, trigger 54 comprises a magnetic field generator, e.g. a permanent magnet, which is mounted about or to rotating arm member 50a, e.g. embedded within rotating arm member 50a, such that trigger 54 rotates with rotating arm member 50a. Angular movement detector 10, comprising sensor 12 (FIG. 2), is mounted about or to stationary arm member 50b, e.g. embedded within stationary arm member 50b. A rotating magnetic field created by trigger 54 is detected by sensor 12, e.g. as the magnet rotates with respect to sensor 12, a magnetic field passes through one or more titanium windows 56 (FIG. 2).

As further illustrated in FIG. 4, moveable portions of an arm, rotating arm 50a which are illustrated with the same hatch marks, rotate about the axis A-A. Trigger 54 (FIG. 2) is disposed in or about rotating arm member 50a. Stationary arm member 50b, hatched using a different pattern and at a different angle, contains one or more angular movement detectors 10 comprising sensor 12 and titanium window 56 (FIG. 2). In certain embodiments, titanium window 56 is not moveable once installed.

Figure 5:
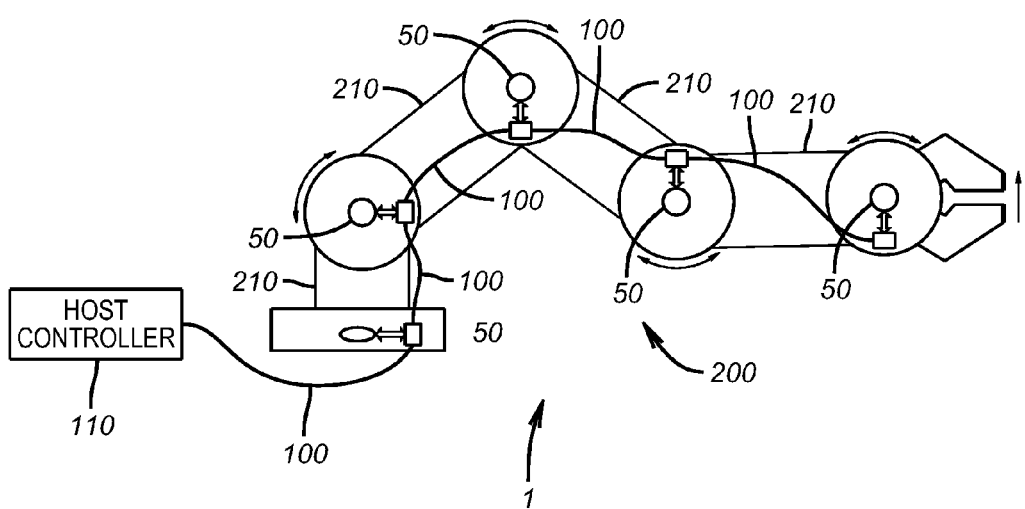
FIG. 5 is a schematic view of a non-redundant embodiment of a control network using angular movement detectors.

Referring now to FIG. 5, in an embodiment, position sensing system 1 is adapted for aiding in determining angular position of members 50 of articulated arm 200. Articulated arm 200 and its incorporated angular movement detectors 10 may be adapted for use subsea.

In an embodiment, position sensing system 1 is disposed about and/or within articulated arm 200 and comprises one or more angular movement detectors 10 disposed in joints 50 of articulated arm 200, communications network 100, and triggers 54 disposed external to angular movement detector 10. In a preferred embodiment, one trigger 54 is present for each angular movement detector 10.

Angular movement detector 10 is as described above and is operatively in communication with communications network 100. Angular movement detectors 10 are linked to each other and controller 110 via communications network 100, which, in the preferred embodiment, is a Controller Area Network ("CAN"), as that term will be familiar to those of ordinary skill in the art. Other data networks may be used, e.g. Bluetooth, WiFi, wired, fiber optic, or the like, or combinations thereof.

Position sensing system 1 uses communications network 100 to obtain and otherwise transmit data from angular movement detectors 10 arranged along joints 50 of articulated arm 200 to sense position of members 210 of articulated arm 200 with respect to adjacent members 210 of articulated arm 200.

In an embodiment, at least one sensor 12 is disposed within each angular movement detector 10 and adapted to detect an orientation of a magnetic field and produce a digital signal representation of the sensed magnetic field. The digital signal may be produced by angular movement detector 10 or by electronics 14 associated with angular movement detector 10. Trigger 54, e.g. a magnetic field generator, is disposed external to angular movement detector 10, proximate sensor 12 and in a fixed position relative to joint 50. Communications network 100, e.g. a digital data communications network, is operatively in communication with each angular movement detector 10 and host controller 110 where host controller 110 is adapted to receive and process the digital signal representation from sensor 12 to aid in controlling the movement of articulated arm 200.

In a further embodiment, a unique one of a plurality of articulated members 50 may be disposed within a predetermined set of joints 50 of articulated members 210, e.g. within each such joint 50.

Figure 6:
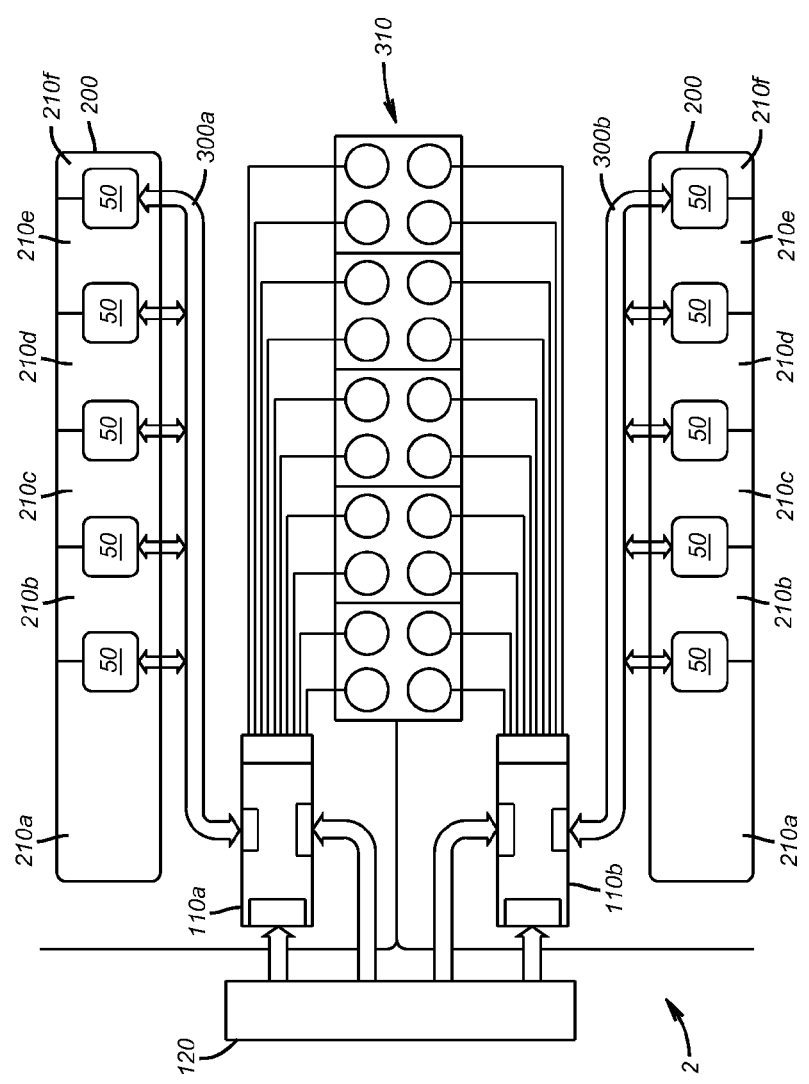
FIG. 6 is a schematic view of a redundant embodiment a control network using angular movement detectors.

Referring now to FIG. 6, in a further embodiment, articulated arm 200 comprises one or more angular movement detectors 10 disposed in predetermined joints 50 of articulated arm 200, e.g. one angular movement detector 10 (FIG. 1) in each joint 50. Sensors 12 (FIG. 1) within angular movement detectors 10 are linked to each other and controllers 110a, 110b via a plurality of communications networks 300, e.g. 300a and 300b, which, in the preferred embodiment, are CANs arranged in a redundant configuration. As illustrated in FIG. 6, each arm 200 is the same arm 200 and shown in mirror configuration.

For example, each communications network 300a,300b is redundantly in communication with the same set of angular movement detectors 10 (FIG. 1) disposed within joint 50 of articulated arm 200 which are adapted to sense a position of a first segment 210 of articulated arm 200, e.g. 210a, with respect to an adjacent segment 210 of articulated arm 200, e.g. 210b. In an alternative embodiment, each communications network 300 can be in communication with a parallel set of angular movement detectors 10.

A plurality of controllers 110a, 110b are adapted to control movement of articulated arm 200 and may be configured in any number of equivalent redundant configurations, e.g. master-slave. A corresponding plurality of data communications networks 300a, 300b are operatively interconnected with angular movement detectors 10 such that a predetermined one of data communications networks 300a, 300b is linked to a corresponding predetermined one of the two controllers 110a, 110b.

Figure 7:
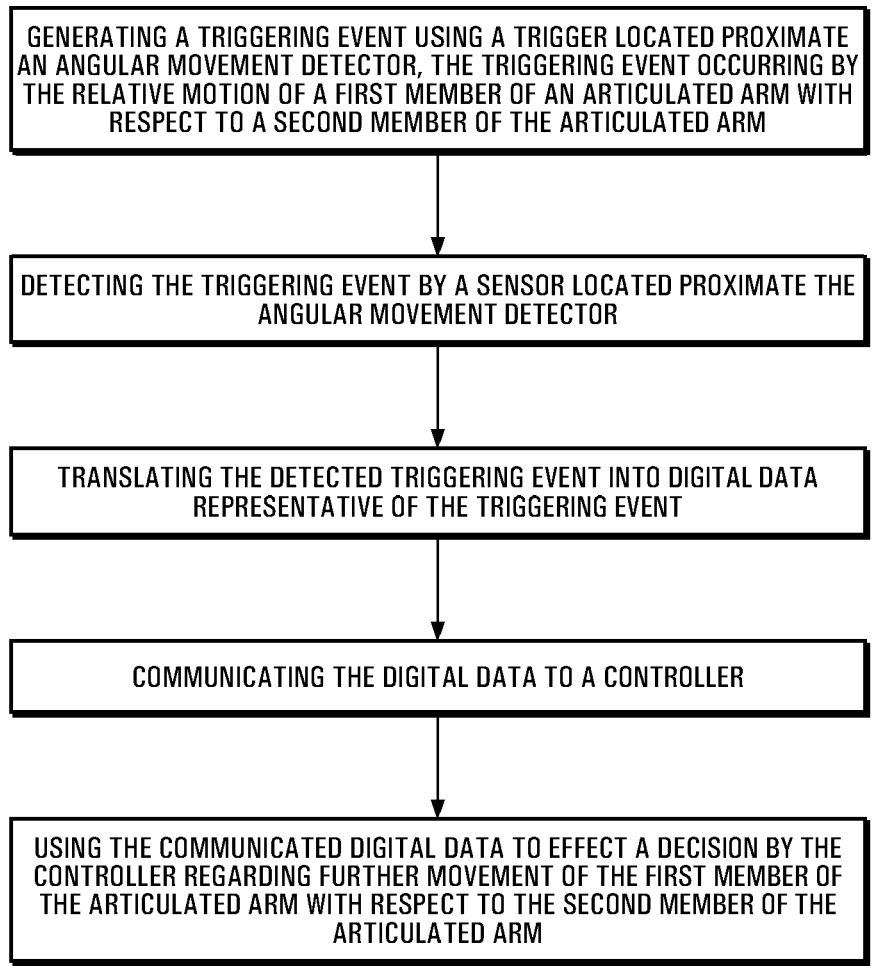
FIG. 7 is a flowchart of an exemplary method of using a control network using angular movement detectors.

In the operation of an exemplary embodiment, referring now to FIG. 7, sensors 12 mounted within or proximate angular movement detector 10 react to trigger 54, e.g. an electromagnetic field flux generated by electromagnetic field generator 54, to produce a signal representative of the triggering event, e.g. a change in the electromagnetic field flux. The signal may be translated into a digital representation and communicated via communications network 200 to controller 110 which may then interpret the digital representation to resolve angular movement of joint 50 in or about which angular movement detector 10 is disposed.

It will be understood that varioud changes in the details, materials, and arrangements of the parts which have been described and illustrated above in order to explain the nature of this invention may be made by those skilled in the art without departing from the principle and scope of the invention as recited in the appended claims.

I claim:

1. An angular movement detector, comprising:
   a. a trigger mounted proximate a joint of two articulated members; and
   b. an angle orientation sensor disposed proximate the trigger and proximate the joint of the two articulated members, the angle orientation sensor adapted to detect an angular orientation of the articulated members with respect to each other in at least one plane, the angle orientation sensor further mechanically decoupled from rotation of the joint with respect to the trigger.

2. The angular movement detector of claim 1, wherein the angle orientation sensor is further adapted to communicate with a communications network.

3. The angular movement detector of claim 1, wherein:
   a. the trigger is an electromagnetic field generator disposed proximate to the angle orientation sensor; and
   b. the angle orientation sensor is adapted to detect a predetermined characteristic of an electromagnetic field generated by the trigger.

4. The angular movement detector of claim 3, wherein the angle orientation sensor comprises at least one of (i) an anisotropic magneto-restrictive sensor, (ii) a single-axis Hall-effect sensor, or (iii) a multi-axis Hall-effect sensor.

5. The angular movement detector of claim 1, wherein:
   a. the joint further comprises an annulus adapted to receive a protective fluid adapted to protect electronics from exposure to seawater; and
   b. the angle orientation sensor is disposed within the annulus.

6. The angular movement detector of claim 5, wherein:
   a. the angle orientation sensor is disposed in fluid disposed in the annulus; and
   b. the angle orientation sensor is reactive to characteristic of a magnetic field.

7. A system for determining angular position of two members joined and movable with respect to each other in two planes, comprising:
   a. two articulated members rotatably mounted to each other about a joint, the rotation defined with respect to two planes;
   b. an angular movement detector disposed within the joint of the articulated members, the angular movement detector comprising a sensor adapted to sense a triggered angular movement event and produce a digital signal representation of the sensed triggered event;
   c. a trigger adapted to create the triggered angular movement event and disposed external to the angular movement detector proximate the sensor and in a fixed position relative to the joint;
   d. a host controller, adapted to receive and process the digital signal representation from the sensor; and
   e. a digital communications network operatively in communication with the sensor and the host controller.

8. The system for determining angular position of claim 7, wherein:
   a. the trigger is an electromagnetic field generator;
   b. the triggered event is a change in the electromagnetic field; and
   c. the sensor is adapted to sense the change in the electromagnetic field.

9. A position sensing system, comprising:
   a. a communications network;
   b. an angular movement detector comprising an angular movement sensor adapted to detect a predetermined characteristic of an electromagnetic field, the angular movement sensor operatively in communication with the communications network; and
   c. an electromagnetic field generator disposed external to the angular movement detector and adapted to create an electromagnetic field strong enough to be sensed by the angular movement sensor.

10. The position sensing system of claim 9, wherein the communications network is at least one of (i) a Controller Area Network, (ii) a wireless network, (iii) a wired network, or (iv) a fiber optic network.

11. The position sensing system of claim 9, wherein the joint further comprises a titanium window adapted to receive the angular movement detector.

12. The position sensing system of claim 9, wherein the angular movement detector is adapted to be mounted at least one of (i) within an arm joint of two rotatably joined articulated members or (ii) proximate an arm joint of two rotatably joined articulated members.

13. The position sensing system of claim 9, wherein the angular movement sensor comprises at least one of (i) an anistropic magneto-restrictive sensor or (ii) a Hall-effect sensor.

14. The position sensing system of claim 9, wherein:
   a. the arm joint further comprises an annulus adapted to receive a protective fluid; and
   b. the angular movement detector is disposed within the annulus.

15. The position sensing system of claim 14, wherein:
   a. the angular movement sensor is sensitive to an orientation of a magnetic field;
   b. the angular movement sensor is disposed in a protective fluid disposed in the annulus; and
   c. the electromagnetic field generator is a magnetic field generator.

16. The position sensing system of claim 9, wherein the electromagnetic field generator is a magnet.

17. A control network adapted to control movement of an articulated arm, comprising:
   a. an angular movement detector disposed within a joint of an articulated arm and adapted to sense a position of a first segment of the articulated arm with respect to an adjacent segment of the articulated arm at the joint;
   b. a plurality of controllers adapted to control movement of the articulated arm; and
   c. a plurality of data communications networks, each of the plurality of data communications networks operatively and redundantly interconnecting the angular movement detector with a predetermined corresponding one of the plurality of controllers.

18. The control network of claim 17, wherein the articulated arm and angular movement detector are adapted for use subsea.

19. A method for determining angular movement of a first member of an articulated arm with respect to a second member of the articulated arm, the members rotatably joined at a joint to effect motion in two planes, comprising:
   a. generating a triggering event using a trigger located proximate an angular movement detector, the triggering event occurring by the relative angular motion of a first member of an articulated arm with respect to a second member of the articulated arm;
   b. detecting the triggering event by an angular movement sensor located proximate the angular movement detector;
   c. translating the detected triggering event into digital data representative of the triggered event;

d. communicating the digital data to a controller; and
e. using the communicated digital data to effect a decision by the controller regarding further movement of the first member of the articulated arm with respect to the second member of the articulated arm.

20. The method of claim 19, wherein the trigger is located at least one of (i) outside the angular movement detector and the angular movement sensor is located within the angular movement detector or (ii) within the angular movement detector and the sensor is located outside the angular movement detector.

* * * * *